United States Patent
Loi et al.

(10) Patent No.: US 11,073,974 B2
(45) Date of Patent: Jul. 27, 2021

(54) ELECTRONIC DEVICE AND OPERATION METHOD OF PARAMETER SELECTION THEREOF

(71) Applicant: ASUSTEK COMPUTER INC., Taipei (TW)

(72) Inventors: Wean-Fong Loi, Taipei (TW); Yue-Hin Victor Kong, Taipei (TW); Ee-Fun Teo, Taipei (TW)

(73) Assignee: Asustek Computer Inc., Taipei (TW)

(*) Notice: Subject to any disclaimer, the term of this patent is extended or adjusted under 35 U.S.C. 154(b) by 472 days.

(21) Appl. No.: 15/859,944

(22) Filed: Jan. 2, 2018

(65) Prior Publication Data
US 2018/0210637 A1 Jul. 26, 2018

(30) Foreign Application Priority Data
Jan. 23, 2017 (TW) .................. 106102422

(51) Int. Cl.
G06F 3/0484 (2013.01)
G04G 21/08 (2010.01)
G06F 3/0488 (2013.01)
H04B 1/3827 (2015.01)

(52) U.S. Cl.
CPC ......... G06F 3/04847 (2013.01); G04G 21/08 (2013.01); G06F 3/04883 (2013.01); G06F 3/04886 (2013.01); H04B 1/385 (2013.01)

(58) Field of Classification Search
CPC ............ G06F 3/04847; G06F 3/04883; G06F 3/04886; G04G 21/08
See application file for complete search history.

(56) References Cited

U.S. PATENT DOCUMENTS

| 2010/0301780 A1* | 12/2010 | Vinkenvleugel ........ F21V 23/04 315/362 |
| 2014/0203710 A1* | 7/2014 | Li ...................... H05B 33/0857 315/129 |
| 2014/0245226 A1* | 8/2014 | Butscher ............... G06F 3/0483 715/834 |

(Continued)

FOREIGN PATENT DOCUMENTS

| CN | 103874978 A | 6/2014 |
| CN | 104969165 A | 10/2015 |
| WO | WO2014123632 A1 | 8/2014 |

Primary Examiner — Angie Badawi
(74) Attorney, Agent, or Firm — Muncy, Geissler, Olds & Lowe, P.C.

(57) ABSTRACT

An electronic device and an operation method of parameter selection are provided. According to the method, a first parameter adjustment interface is displayed on a touch display. The first parameter adjustment interface includes an inner circular area and a surrounding area surrounding the inner circular area. The surrounding area closest to the touched first position corresponds to a first parameter value. When the object slides from the first position to a second position of the peripheral region, the touch display is switched to a second parameter adjustment interface The selected area of the second parameter adjustment interface displays the first parameter value. When the object slides from the second position to a third position along the peripheral region, the selected area is switched to display a second parameter value corresponding to the third position.

12 Claims, 13 Drawing Sheets

(56) References Cited

U.S. PATENT DOCUMENTS

2016/0188152 A1* 6/2016 Chou ................... G06F 3/0488
345/173
2017/0354019 A1* 12/2017 Julian ................ H05B 37/0272

* cited by examiner

ELECTRONIC DEVICE AND OPERATION METHOD OF PARAMETER SELECTION THEREOF

CROSS-REFERENCE TO RELATED APPLICATION

This application claims the priority benefit of TW application serial No. 106102422, filed on Jan. 23, 2017. The entirety of the above-mentioned patent applications are hereby incorporated by references herein and made a part of specification.

BACKGROUND OF THE INVENTION

Field of the Invention

The disclosure relates to an electronic device and, more specifically, to a wearable electronic device.

Description of the Related Art

More and more types of wearable electronic devices are launched. For example, a smart watch worn on the wrist usually includes many functions, such as the function of answering calls, viewing notifications, transceiving messages, playing music or monitoring a heart rate. However, since the wearable electronic device is configured to be worn on the wrist, the size of the wearable electronic device is usually not large enough, and the touch screen is usually small, which is inconvenient for the touch operation.

In addition, the setting or the operation mode of numerical values can be changed via vertical or horizontal gestures or by scrolling the numerical value on the display screen via a physical dial. However, the operation of the gestures is complicated and inconvenient for users. Moreover, most of the display screen is covered by the user's fingers in the operation, and thus it's difficult for the user to view the content.

BRIEF SUMMARY OF THE INVENTION

According to an aspect of the disclosure, an operation method of parameter selection for an electronic device is provided. The electronic device comprises a body and a touch display. The operation method comprises the following steps: displaying a first parameter adjustment interface on the touch display, the first parameter adjustment interface includes an inner circular area and a surrounding area surrounding the inner circular area, different positions on the surrounding area corresponds to different parameter values; touching a first position of the inner circular area via an object, the surrounding area closest to the first position corresponds to a first parameter value, the inner circular area displays the first parameter value; sliding from the first position to a second position of the peripheral region, the touch display is switched to display a second parameter adjustment interface, the second parameter adjustment interface includes a selected area, the selected area displays the first parameter value; and sliding from the second position to a third position along the peripheral region, the selected area is switched to display a second parameter value corresponding to the third position from the first parameter value.

According to an aspect of the disclosure, an electronic device is provided. The electronic device comprises: a touch display; a body; a processing unit, configured in the body; and a memory unit, configured in the body and connected to the processing unit, the memory unit stores an instruction, when the instruction is executed by the processing unit, the processing unit executes: displaying a first parameter adjustment interface on the touch display, the first parameter adjustment interface includes an inner circular area and a surrounding area surrounding the inner circular area, different positions on the surrounding area corresponds to different parameter values; determining that the surrounding area closest to the first position corresponds to a first parameter value when information that the object touches a first position of the inner circular area is received, the inner circular area displaying the first parameter value; switching the touch display to display a second parameter adjustment interface when the information that the object slides from the first position to a second position of the peripheral region is received, the second parameter adjustment interface includes a selected area, and the selected area displays the first parameter value; and switching the selected area to a second parameter value corresponding to the third position from the first parameter value when the information that the object slides from the second position to a third position along the peripheral region is received.

From above, in an electronic device and an operation method of parameter selection in embodiments, a first position of an inner circular area of a first parameter adjustment interface is first touched via an object. Then, when the object slides from the first position to the second position of the peripheral region, the touch display is switched to display a second parameter adjustment interface from the first parameter adjustment interface, and a selected area of the second parameter adjustment interface displays a first parameter value.

Moreover, when the object slides from a second position to a third position along the peripheral region, the selected area is switched to display a second parameter value corresponding to the third position from the first parameter value. Therefore, one sliding gesture is enough to execute a parameter selection for a user. The parameter selection and setting could be executed in a small area more conveniently and quickly. In addition, since the sliding operation is in a specific area of the display screen, the covered area of the display screen is small, it is convenient for users to watch and set the values.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

An electronic device and an operation method of parameter selection according to an embodiment of the present invention will be described with reference to the drawings. The same number denotes the same component. The electronic device is a smart watch, a cellphone, or a laptop, which is not limited. In the following embodiments, the electronic device is a smart watch as an example.

Figure 1A:
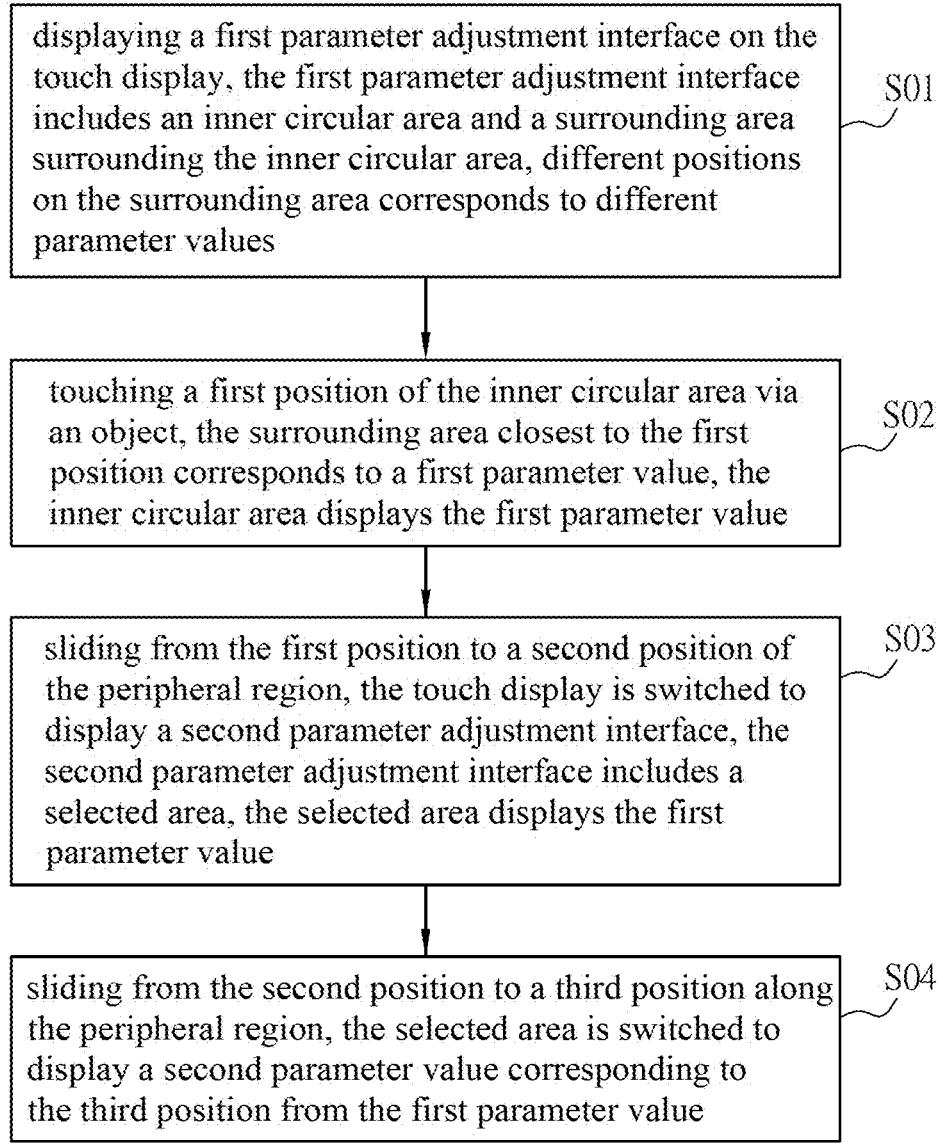
FIG. 1A is a flow chart of an operation method of parameter selection of a smart watch in an embodiment.
Figure 1B:
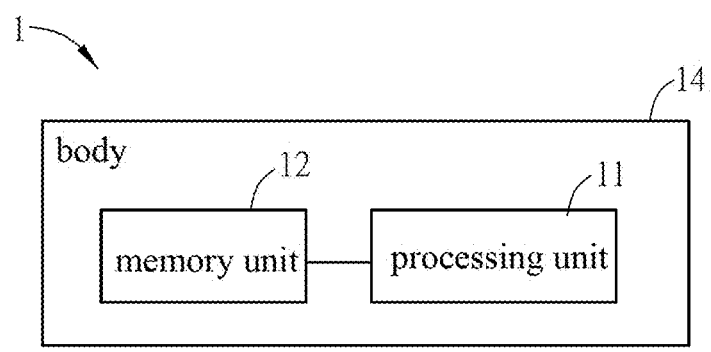
FIG. 1B is a block diagram of a smart watch in an embodiment.
Figure 1C:
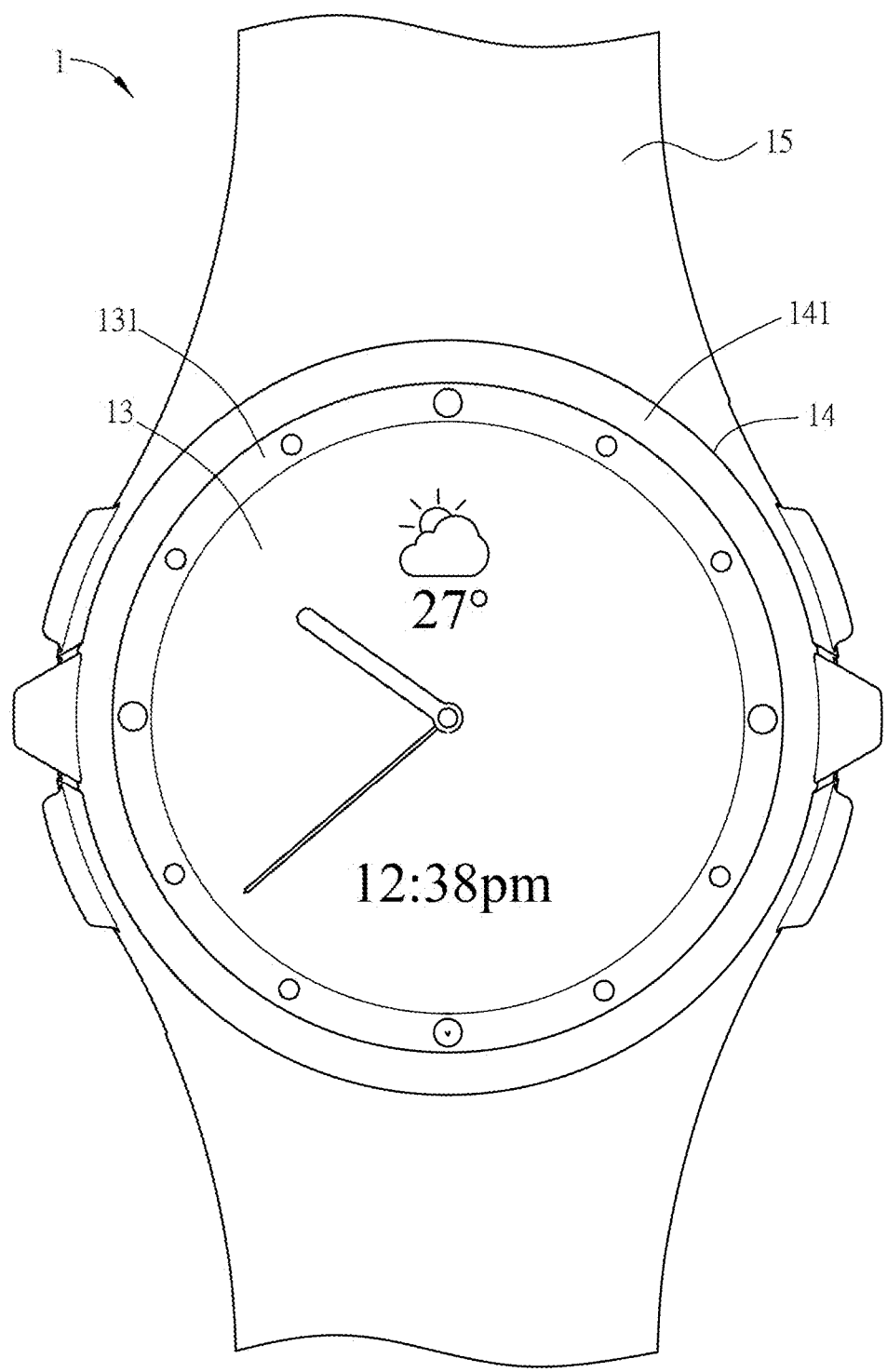
FIG. 1C is an external view of a smart watch in an embodiment.
Figure 1D:
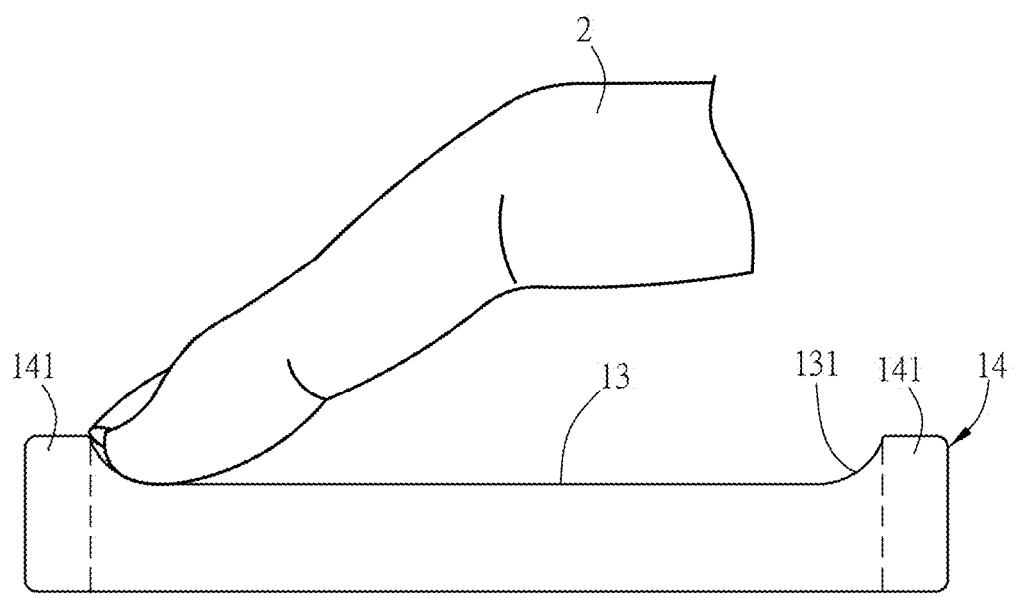
FIG. 1D is a schematic view showing an operation of a smart watch in an embodiment.

Please refer to FIG. 1A to FIG. 1D. FIG. 1A is a flow chart of an operation method of parameter selection of a smart watch in an embodiment. FIG. 1B is a block diagram of a smart watch in an embodiment. FIG. 1C is an external view of a smart watch in an embodiment. FIG. 1D is a schematic view showing an operation of a smart watch in an embodiment.

In embodiments, the parameter selection of a smart watch includes a color parameter selection, a time selection, a frequency selection or an adjustment and a setting of other parameter values. As shown in FIG. 1A, the operation method of parameter selection at least includes steps S01, S02, S03 and S04. In step S01, a first parameter adjustment interface is displayed on a touch display. The first parameter adjustment interface includes an inner circular area and a surrounding area surrounding the inner circular area. Different positions in the surrounding area correspond to different parameter values.

In step S02, a first position of the inner circular area is touched via an object. The surrounding area closest to the first position corresponds to a first parameter value, and the inner circular area displays the first parameter value. In step S03, the object slides from the first position to a second position of a peripheral region. The touch display is switched to display a second parameter adjustment interface. The second parameter adjustment interface has a selected area. The selected area displays the first parameter value. In step S04, the object slides from the second position to a third position along the peripheral region. The selected area is changed to display a second parameter value corresponding to the third position from the display of the first parameter value.

As shown in FIG. 1B, the smart watch 1 includes one or multiple processing unit(s) 11, a memory unit 12 and a body 14. The memory unit 12 is connected to one or multiple processing unit(s) 11 via a bus. The processing unit 11 and the memory unit 12 are disposed in the body 14.

The processing unit 11 accesses data stored in the memory unit 12 and includes control components of the smart watch 1. For example, the processing unit 11 includes at least one central processing unit (CPU) and a memory. In an embodiment, the processing unit 11 includes other control hardware, software or firmware, which is not limited herein.

The memory unit 12 stores at least one application software, such as APP software including one or multiple instructions. When one or more program instructions are executed by the processing unit 11 to adjust the value, the steps S01 to S04 are executed via the processing unit 11, which will be described in detail below.

In an embodiment, the memory unit 12 is a non-transitory computer readable storage medium, such as a memory, a memory card, a compact disc, a video tape, a computer tape, or any combination thereof. In an embodiment, the memory is a read-only memory (ROM), a flash memory, or a Field-Programmable Gate Array (FPGA), or a combination thereof. In an embodiment, the memory unit 12 is a memory in the smart watch 1. In an embodiment, the memory unit 12 is a cloud memory at a cloud device. The application software is stored in the cloud device. The application software is executed after the application software is loaded to the smart watch 1 from the cloud device.

Please refer to FIG. 1C and FIG. 1D. The smart watch 1 further includes a touch display 13 and a watch band 15. The watch band 15 is connected to the body 14 and is worn on a wrist. The body 14 includes a bezel 141 surrounding the touch display 13. A height of the bezel 141 is higher than that of the touch display 13. In addition, the touch display 13 includes a peripheral region 131.

The peripheral region 131 is at the outer periphery of the touch display 13. The peripheral region 131 is connected to the bezel 141. As shown in FIG. 1D, the height of the peripheral region 131 is decreased gradually from the height of the bezel 141 to the height of an inner side of the touch display 13. Thus, an object 2 (such as finger) slides along the peripheral region 131 of the touch display 13 conveniently. Moreover, the object 2 is prevented from sliding out of the touch display 13 via a blocking of the bezel 141 with a higher height.

In the embodiment, the operation process of parameter selection is executed to set a color parameter. Each color corresponds to one parameter value. In the embodiment, a color parameter is represented by a color. One color represents one parameter or one parameter value. That is, one parameter or one parameter value in the following embodiments represents one color. For example, the first parameter value represents a first color, and the second parameter value represents a second color. Correspondingly, a color represents a parameter or a parameter value. In FIGS. 2A to 2G, gray level images are shown. Persons having ordinary skill in the art would know the detailed process of color (parameter) selection. In different embodiments, the operation of parameter selection is time selection, frequency selection, or other parameter selections, which is not limited herein.

As shown in FIGS. 2A to 2G, detailed steps and processes of the operation method of color selection of a smart watch are described. FIGS. 2A to 2G are schematic views of different images displayed on the smart watch 1 of FIG. 1C in an embodiment.

The touch display 13 of the smart watch 1 has a display and touch function. The smart watch 1 can be operated or controlled by sliding on the touch display 13 via the object 2 (such as a finger or a stylus).

Figure 2A:
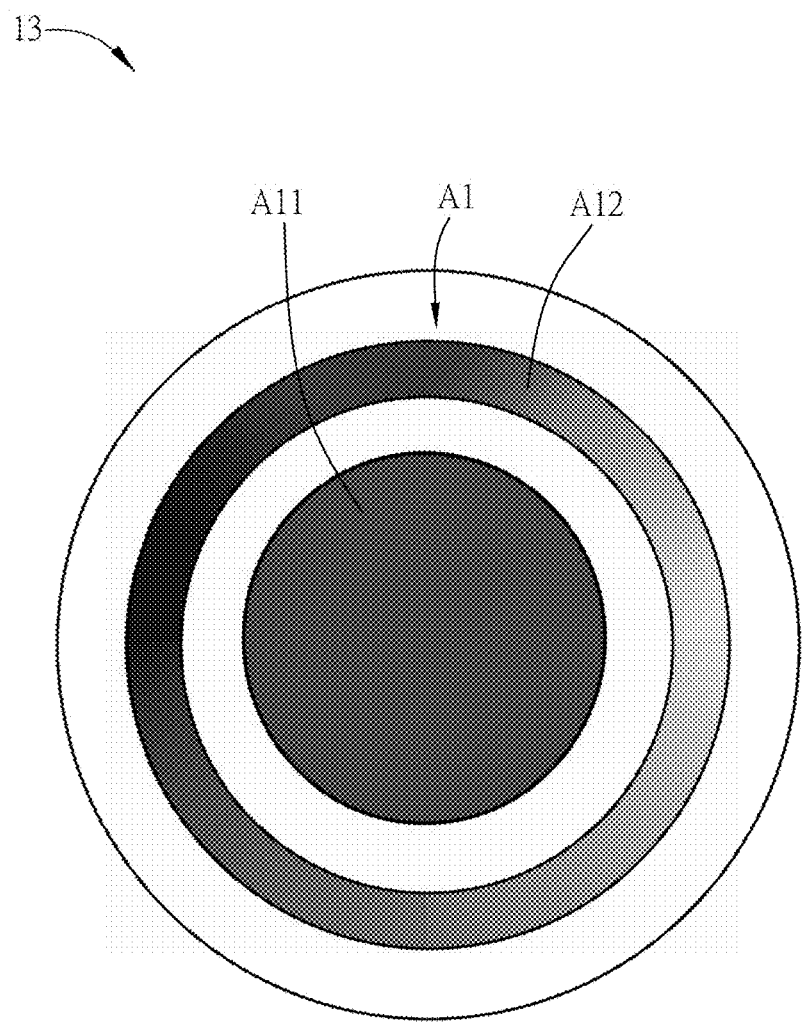
FIG. 2A to FIG. 2G are schematic views of different images displayed on a smart watch of FIG. 1C in an embodiment.

As shown in FIG. 2A, when one or multiple instruction(s) stored in the memory unit 12 is executed via the processing unit 12, the smart watch 1 enters a color adjustment interface. At this time, the processing unit 11 controls the touch display 13 to display a first parameter adjustment interface A1. The first parameter adjustment interface A1 includes an inner circular area A11 and a surrounding area A12 surrounding the inner circular area A11. Different position in the surrounding area A12 corresponds to different colors (step S01).

In the embodiment, the first parameter adjustment interface A1 is a color adjustment interface, which is a coarse adjustment interface. The inner circular area A11 is a color preview area to preview a selected color. The surrounding area A12 is at the outside of the inner circular area A11. The surrounding area A12 is an annular ring surrounding the inner circular area A11.

The colors of the surrounding area A12 are gradient colors. For example, the color gradually changes from a red color system (about in 11:30 time direction to 1:30 time direction), to a yellow color system (about in 1:30 direction time to 4:30 time direction), a green color system (about in 4:30 time direction to 8:00 time direction), a blue color system (about in 8:00 time direction to 11:30 time direction), and further then to a red color system. Therefore, the user can select an approximate color via the first parameter adjustment interface A1. The selected color is previewed in the inner circular area A11.

In an embodiment, when the first parameter adjustment interface A1 is a time adjustment interface, different positions in the surrounding area A12 correspond a time interval with a larger metric therebetween (that is, a coarse adjustment). The inner circular area A11 displays the time interval corresponding to the first position P1.

Figure 2B:
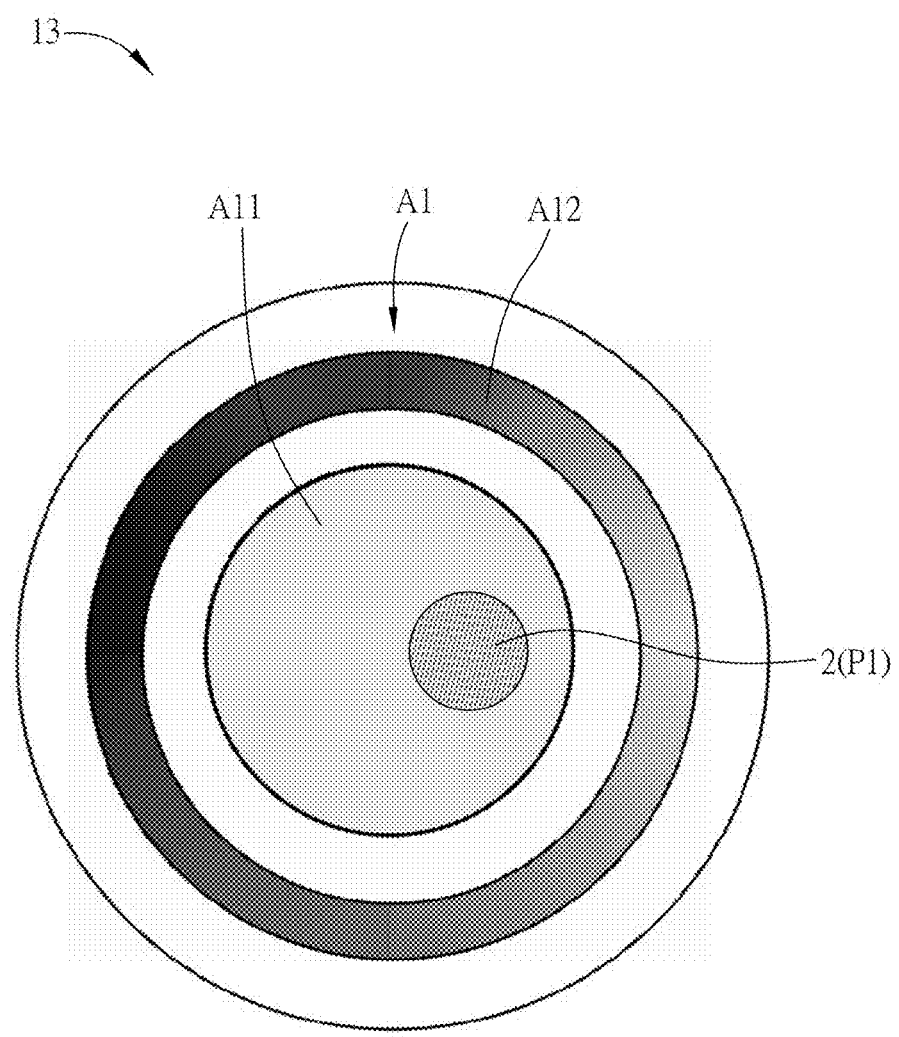

Then, in step S02, the first position P1 of the inner circular area A11 is touched via the object 2 (the first position P1 is touched via the object 2, and the object 2 and the first position P1 are marked as 2(P1)). The surrounding area A12 closest to the first position P1 corresponds to a first color. The inner circular area A11 displays the first color (step S02). In detail, the processing unit 11 receives the information that first position P1 of the inner circular area A11 is touched via the object 2. The color corresponding to the position of the surrounding area A12 closest to the first position P1 is selected. Therefore, as shown in FIG. 2B, since the color corresponding to the position of the surrounding area A12 closest to the first position P1 is yellow, the processing unit 11 controls the inner circular area A11 to display yellow correspondingly. Step S02 is referred to as a color coarse adjustment step.

Figure 2C:
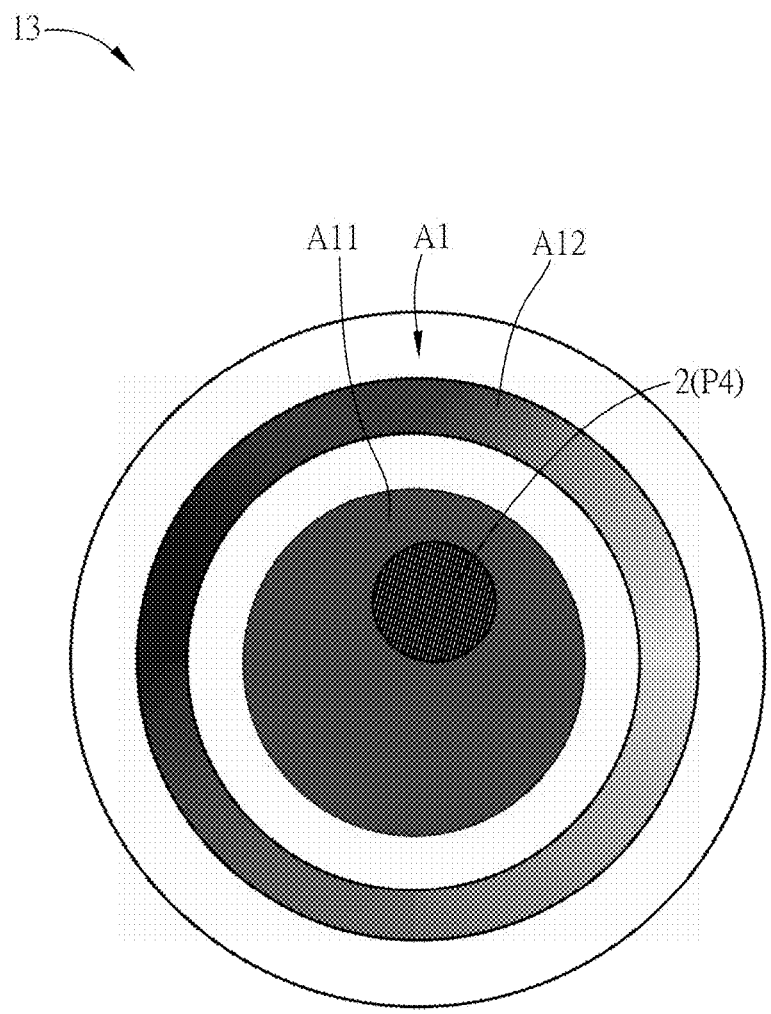

If the user does not like the previewed color corresponding to the first position P1, the object slides from the first position P1 to another position in the inner circular area A11 (as shown in FIG. 2C, represented as a fourth position P4) before the color selection. Then, the position of the surrounding area A12 closest to the fourth position P4 corresponds to another color (referred to as a third color herein). Therefore, the inner circular area A11 displays the third color (such as a red color) corresponding to the surrounding area A12 closest to the touched position P4. In the step of sliding from the first position P1 to the fourth position P4 in the inner circular area A11, the first color is changed gradually to the third color during the sliding of the object 2. The color can be selected finally by sliding in the inner circular area A11 several times. The sliding should not move out of the inner circular area A11. Then, a wanted color is selected by sliding in the inner circular area A11.

In an embodiment, the user selects the yellow color as the wanted color in step S02 (FIG. 2B), the operation process of the color selection further includes the following steps. The object 2 slides from the first position P1 to the second position P2 of the peripheral region 131 of the touch display 13. The touch display 13 switches to display a second parameter adjustment interface A2 from the first parameter adjustment interface A1 after the processing unit 11 receives the information that the object 2 slides from the first position P1 to the second position P2 of the peripheral region 131. The second parameter adjustment interface A2 has a selected area A21. The selected area A21 displays the first color (step S03).

Figure 2D:
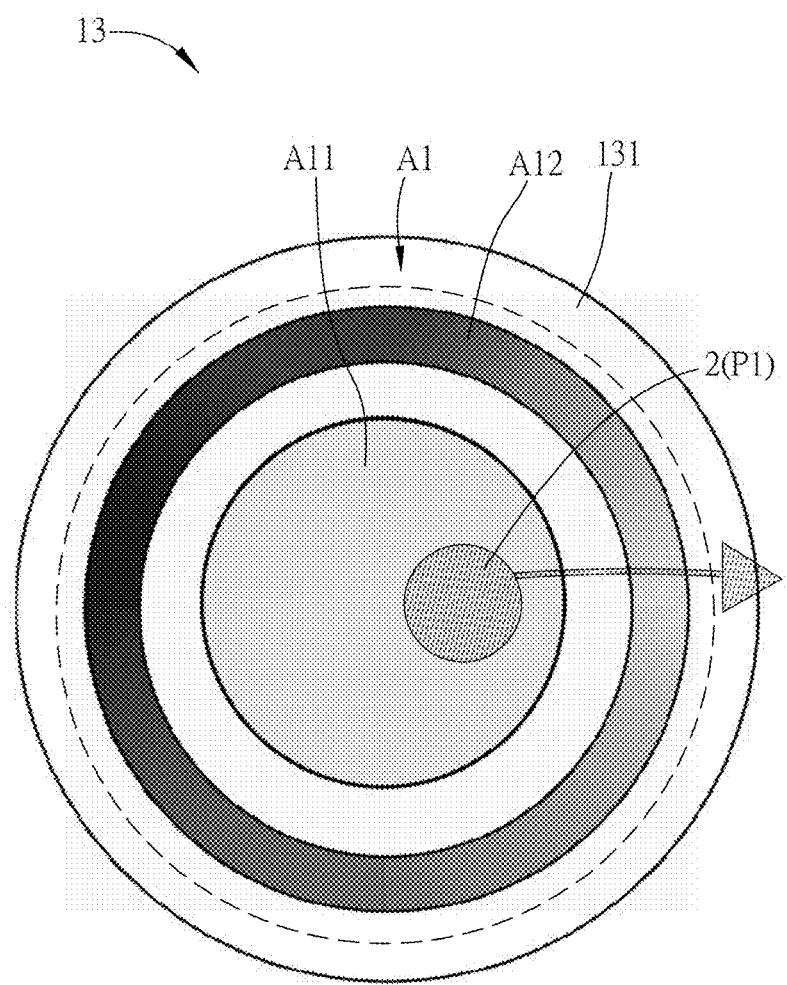
Figure 2E:
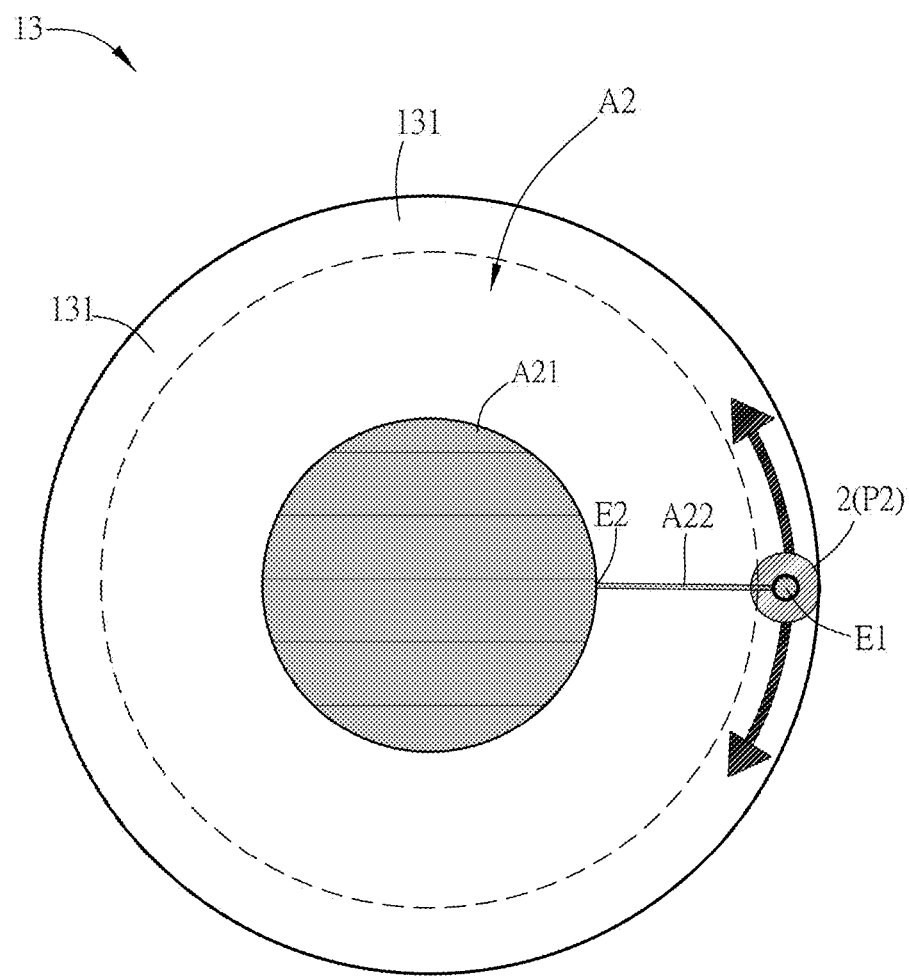

As shown in FIG. 2D and FIG. 2E, after the user selects the yellow color, the object 2 slides toward the peripheral region 131 to the second position P2. The touch display 13 is switched to display the second parameter adjustment interface A2 as shown in FIG. 2E from the first parameter adjustment interface A1 shown in FIG. 2D. In the embodiment, the second parameter adjustment interface A2 is a color fine adjustment interface. The second parameter adjustment interface A2 is configured to adjust the color displayed in the selected area A21 slightly.

In the second parameter adjustment interface A2, the central portion is a circular selected area A21, which is not limited herein. The first color (yellow) selected in step S02 is displayed at the selected area A21. Moreover, except for the selected area A21, the second parameter adjustment interface A2 further includes an adjusting bar A22. A first end E1 of the adjusting bar A22 is at the second position P2 of the peripheral region 131 (the second position P2 touched via the object 2 and the object 2 are marked as 2(P2). The first end E1 overlaps the second position P2). Another end of the adjusting bar A22 (that is, a second end E2) is connected to the selected area A21. In an embodiment, when the second parameter adjustment interface A2 is a time adjustment interface, different positions in the peripheral region 131 correspond to a time interval with a smaller metric (fine adjustment scale) than that of the surrounding area A12. The selected area A21 displays a time interval with a smaller metric of the second position P2.

Then, the operation process of color selection further includes the following steps. The object 2 slides from the second position P2 to the third position P3 along the peripheral region 131. After the processing unit 11 receives the information that the object 2 slides from second position P2 to the third position P3 along the peripheral region 131, the color displayed on the selected area A21 is switched from the first color to the second color corresponding to the third position P3 according to sliding the object 2 simultaneously. As shown in FIG. 2E, when the object 2 slides from the second position P2 to the third position P3 along the peripheral region 131, the object 2 slides clockwise or counterclockwise. In an embodiment, when the object slides clockwise, the second parameter value increases. When the object slides counterclockwise, the second parameter value decreases, which not limited herein.

Figure 2F:
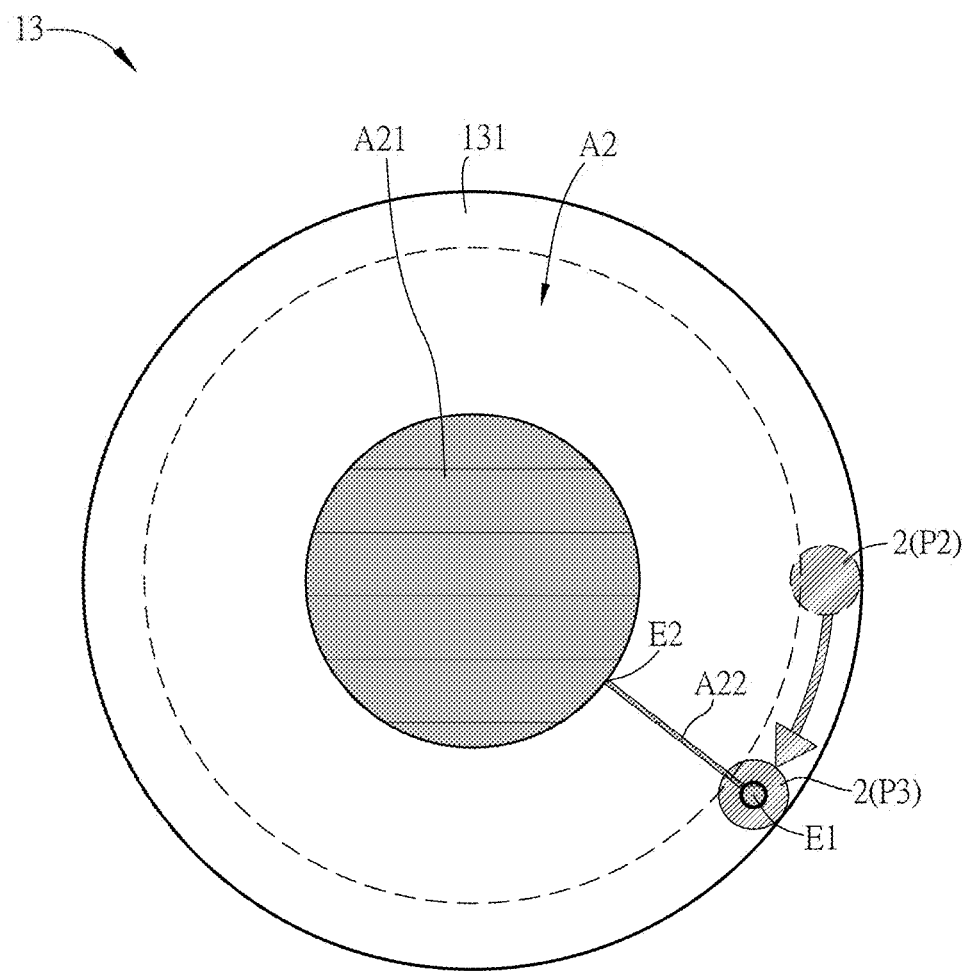

Moreover, as shown in FIG. 2F, in the embodiment, the object slides from the second position P2 to the third position P3 along the peripheral region 131 clockwise. When the object 2 slides from the second position P2 to the third position P3, the first end E1 of the adjusting bar A22 moves with the sliding of the object 2 simultaneously. The adjusting bar A22 also moves with the sliding of the object 2. The second end E2 of the adjusting bar A22 is still connected to the selected area A21. In the embodiment, when the user wants to adjust the selected color slightly, the object 2 slides from the second position P2 to the third position P3 corresponding to the second color (the second color is the wanted color in the embodiment). In the sliding process, the color displayed on the selected area A21 changes from the first color to the second color corresponding to the third position P3 gradually. For example, the color changes from yellow to chartreuse gradually (fine adjustment).

In an embodiment, a sliding distance of the object 2 sliding from the second position P2 to the third position P3 is non-linear related with a parameter difference between the first parameter value (the first color) and the second parameter value (the second color). That is to say, when the sliding distance of sliding the object 2 from the second position P2 to the third position P3 is 5 cm, the difference (the parameter difference) between the first color (the first parameter value) and the second color (the second parameter value) is non-linear related with the sliding distance.

In an embodiment, the distance difference between the first parameter value and the second parameter value is determined according to the sliding distance or a sliding acceleration of sliding the object 2 from the second position P2 to the third position P3. In other words, the larger the sliding distance of the object 2 is, the larger the color change (the value change) is. The larger the acceleration of sliding the object 2 is, the smaller the time for changing color (changing value) is.

Moreover, the object 2 slides along the peripheral region 131 when the object slides at the bezel 141. Since the height of the bezel 141 is larger than that of the touch display 13, the object 2 would not slide out of the touch display 13, which increases the convenience in operation. Moreover, since the object 2 slide along the peripheral region 131 of the touch display 13 in the operation process, the covered area of the display screen is within a minimum range. Therefore, it is convenient for users to watch and set the values.

Figure 2G:
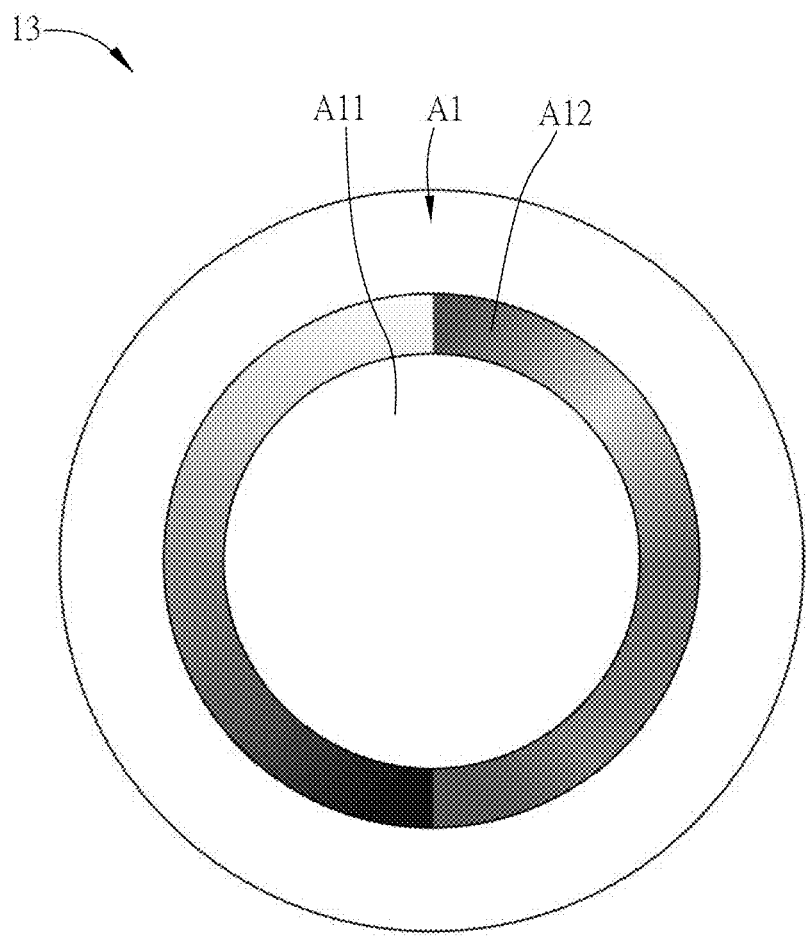

In an embodiment, as shown in the displayed image in FIG. 2G; the displayed image is the first parameter adjustment interface A1. Moreover, the displayed image is a coarse adjustment interface of the color adjustment interface. In the embodiment, the annular surrounding area A12 in FIG. 2G is divided into multiple areas. In FIG. 2G, the surrounding area A12 is divided into two areas (a left area and a right area) corresponding to different series of parameter values, respectively.

For example, the right surrounding area A12 includes colors which change gradually from a red system (about in the 12:00 time direction) to a yellow system, a green system, a blue system and to a purple system (about in the 6:00 time direction). The left surrounding area A12 has a gray level which changes gradually from black to white. For example, the left surrounding area A12 changes from black (about in the 6:00 time direction) to white (about in the 12:00 time direction). Moreover, the operation process of parameter selection on the first parameter adjustment interface A1 shown in FIG. 2G is similar to that in the above embodiments, which is not described again.

Figure 3:
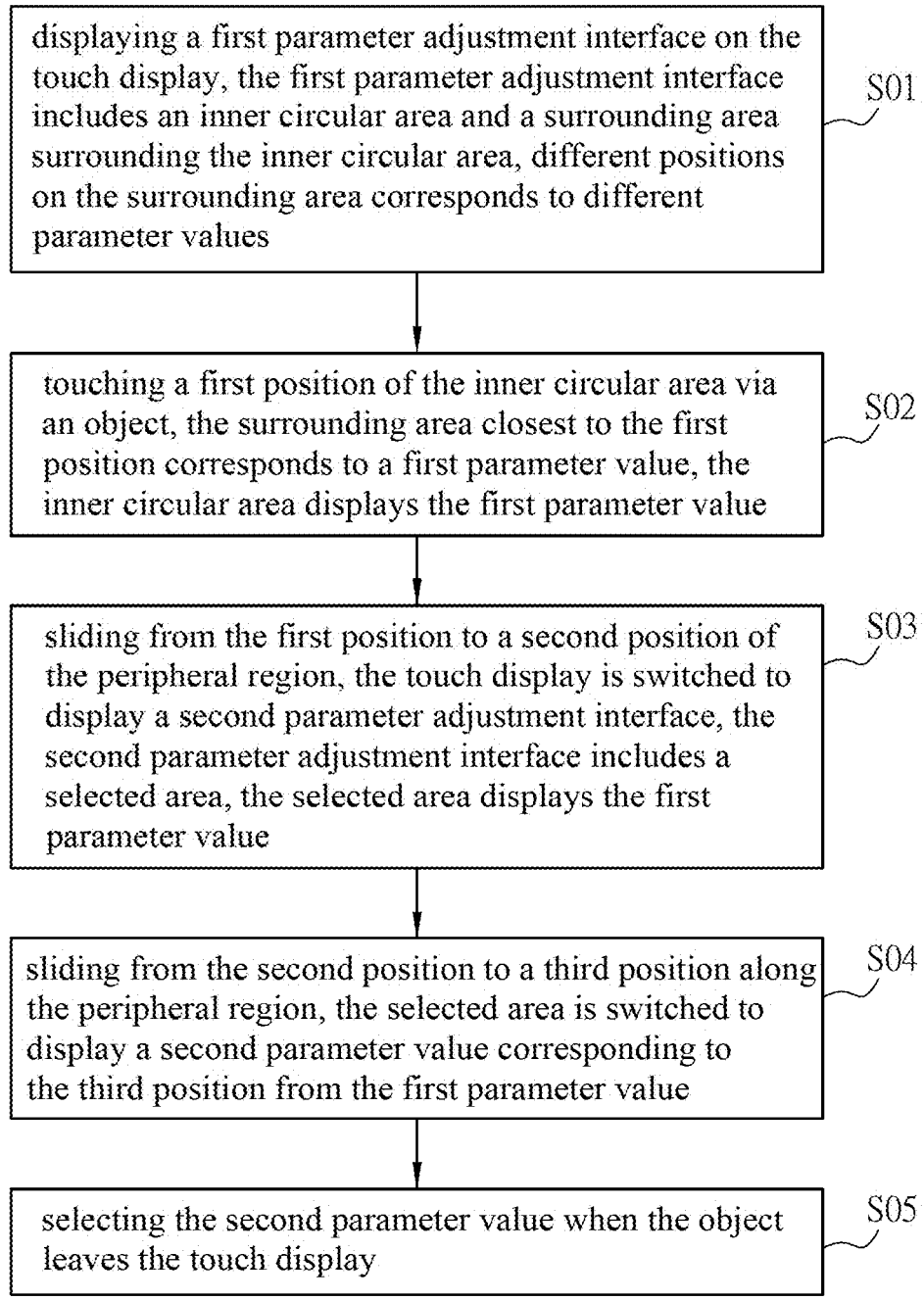
FIG. 3 is a flow chart of an operation method of parameter selection of a smart watch in an embodiment.

FIG. 3 is a flow chart of an operation method of parameter selection of a smart watch in an embodiment. The difference between the embodiment in FIG. 3 and the embodiment in FIG. 1A is that the operation process of the color selection in FIG. 2F further includes the following steps when the user selects the second color. When the second color (the second parameter value) is selected after the object 2 leaves the touch display 13 (step S05), the touch display 13 is switched to the previous displayed image before the display of the color adjustment interface (such as the function image in FIG. 1C).

Figure 4:
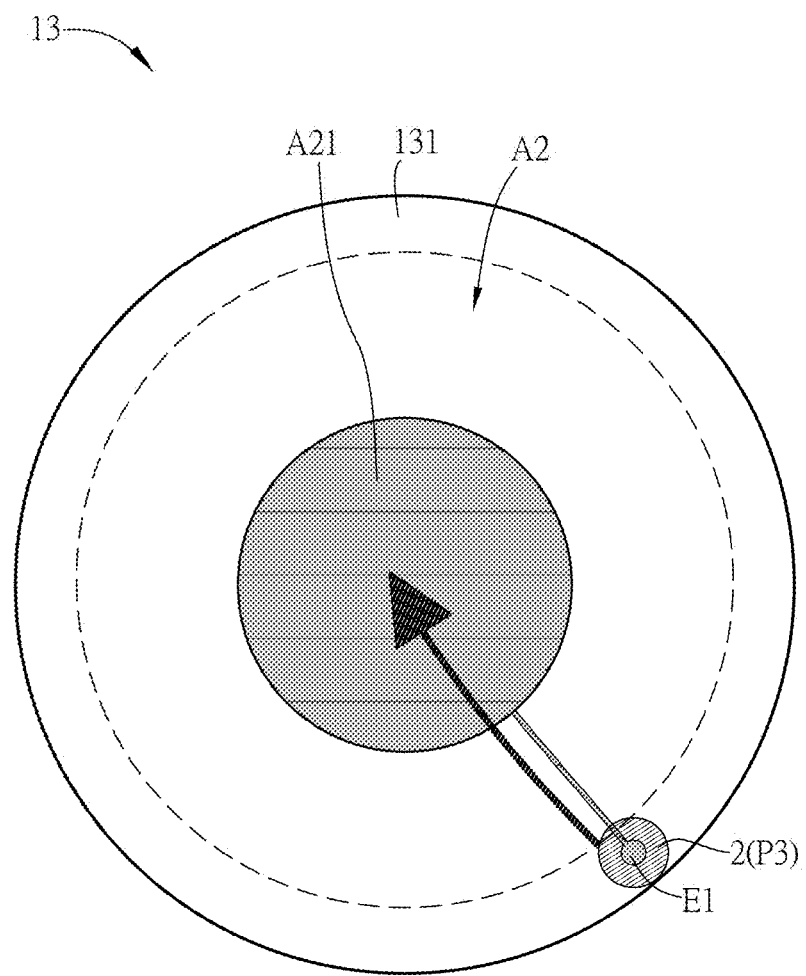
FIG. 4 is a schematic view of a displayed image on a smart watch of FIG. 1C.

However, before the user selects a color, the object could enter the selected area A21 from the third position P3 of the peripheral region 131 again. Then, the touch display A1 is switched to display the first parameter adjustment interface A1, and steps S02~S04 are executed again to select another color. As shown in FIG. 4, before the second parameter value is selected in step S05, the object 2 slides from the third position P3 to a fifth position of the selected area A21 (not shown). At this time, the touch display 13 is switched to display the first parameter adjustment interface A1 (as shown in FIG. 2B) from the second parameter adjustment interface A2. The surrounding area A12 closest to the fifth position corresponds to a fourth parameter value (a fourth color), and thus the inner circular area A11 displays the fourth parameter value (the fourth color) corresponding to the fifth position.

That is to say, before the user selects a color, the user could slide the object 2 between the peripheral region 131 and the inner circular area A11 of the first parameter adjustment interface A1 many times to execute the coarse adjustment and the fine adjustment of color selection. After a color is determined to be selected, the object 2 leaves the touch display 13 to select a color finally.

Moreover, in the selection process, a coarse adjustment interface (the first parameter adjustment interface A1) is entered to execute the coarse adjustment of color before a fine adjustment interface (the second parameter adjustment interface A2) is entered. In another embodiment, a fine adjustment interface (the second parameter adjustment interface A2) is entered first to execute a fine adjustment of color, and then a coarse adjustment interface (the first parameter adjustment interface A1) is entered, which is not limited herein. In the whole process of the color adjustment and selection (before the parameter is finally selected, the object 2 is kept touching the touch display 13 without lifting from the touch display 13). Thus, one operation gesture (such as one sliding) is enough for the whole process of the color adjustment and selection, which is quite convenient for users.

In conclusion, in an electronic device and an operation method of parameter selection in embodiments, a first position of an inner circular area of a first parameter adjustment interface is touched via an object. Then, when the object slides from the first position to the second position of the peripheral region, the touch display is switched to display a second parameter adjustment interface from the first parameter adjustment interface, and a selected area of the second parameter adjustment interface displays a first parameter value.

Moreover, the object can further slide from a second position to a third position along the peripheral region, and then the selected area is switched to display a second parameter value corresponding to the third position from the first parameter value. Therefore, one sliding gesture is enough to execute a parameter selection. The parameter selection and setting could be executed in a small area more conveniently and quickly. In addition, since the sliding operation is in a specific area of the display screen, the covered area of the display screen is small, it is convenient for users to watch and set the values.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A color parameter selecting method for an electronic device, the electronic device comprising a body and a touch display with a main region and a peripheral region surrounding the main region, a first parameter adjustment interface displaying in the main region of the touch display, the first parameter adjustment interface including an inner circular area and a surrounding area surrounding the inner circular area, a gradient color scale provided on the surrounding area indicating different color parameters of the inner circular area; the color parameter selecting method comprising:

receiving a first touch input via an object at any position in the inner circular area of the first parameter adjustment interface as a first position;

displaying a first parameter value in the inner circular area, wherein the first parameter value corresponds to a color in the gradient color scale that is positioned on the surrounding area and closest to the first position;

receiving a first sliding touch input via the object from the first position to an adjusting position in the inner circular area;

displaying an adjusting parameter value in the inner circular area, wherein the adjusting parameter value corresponds to a color in the gradient color scale that is positioned on the surrounding area and closest to the adjusting position;

receiving a second sliding touch input via the object from the first adjusting position to a second position in the peripheral region of the electronic device;

displaying a second parameter adjustment interface that is switched from the first parameter adjustment interface, the second parameter adjustment interface including the inner circular area as a selected area, the selected area displaying the adjusting parameter value;

receiving a third sliding touch input via the object from the second position to a third position in the peripheral region during displaying the second parameter adjustment interface; and displaying a second parameter value in the selected area, wherein an adjustment from the adjusting parameter value to the second parameter value depends on a sliding distance or a sliding acceleration of the third sliding touch input from the second position to the third position in the peripheral region.

2. The method according to claim 1, wherein the second parameter adjustment interface further includes an adjusting bar, the adjusting bar is connected to the selected area, and an end of the adjusting bar corresponds to the second position.

3. The method according to claim 1, wherein displaying the second parameter value in the selected area is performed when the object enters to the peripheral region.

4. The method according to claim 3, wherein before displaying the second parameter value in the selected area, the operation method further comprises:

receiving an additional sliding touch input via the object from the third position to an additional adjusting position in the selected area;

displaying the first parameter adjustment interface;

displaying a fourth parameter value in the inner circular area, wherein the fourth parameter value corresponds to a color in the gradient color scale that is positioned on the surrounding area and closest to the additional adjusting position.

5. The method according to claim 1, wherein, the gradient color scale provided on the surrounding area of the first parameter adjustment interface disappears on the second parameter adjustment interface after the touch display is switched from the first parameter adjustment interface to display the second parameter adjustment interface.

6. An electronic device, comprising:

a touch display with a main region and a peripheral region surrounding the main region, a first parameter adjustment interface displaying in the main region of the touch display, the first parameter adjustment interface including an inner circular area and a surrounding area surrounding the inner circular area, a gradient color scale provided on the surrounding area indicating different color parameters of the inner circular area;

a body;

a processing unit, configured in the body; and a memory unit, configured in the body and connected to the processing unit, the memory unit stores an instruction, when the instruction is executed by the processing unit, the processing unit executes:

receiving a first touch input via an object at any position in the inner circular area of the first parameter adjustment interface as a first position;

displaying a first parameter value in the inner circular area, wherein the first parameter value corresponds to a color in the gradient color scale that is positioned on the surrounding area and closest to the first position;

receiving a first sliding touch input via the object from the first position to an adjusting position in the inner circular area;

displaying an adjusting parameter value in the inner circular area, wherein the adjusting parameter value corresponds to a color in the gradient color scale that is positioned on the surrounding area and closest to the adjusting position;

receiving a second sliding touch input via the object from the adjusting position to a second position in the peripheral region of the electronic device;

displaying a second parameter adjustment interface that is switched from the first parameter adjustment interface, the second parameter adjustment interface including the inner circular area as a selected area, the selected area displaying the adjusting parameter value;

receiving a third sliding touch input via the object from the second position to a third position in the peripheral region during displaying the second parameter adjustment interface; and displaying a second parameter value in the selected area, wherein an adjustment from the adjusting parameter value to the second parameter value depends on a sliding distance or a sliding acceleration of the third sliding touch input from the second position to the third position in the peripheral region.

7. The electronic device according to claim 6, wherein the touch display includes a peripheral region, the body includes a bezel surrounding the peripheral region, a height of the peripheral region is decreased gradually from that of the bezel to that of an inner side of the touch display.

8. The electronic device according to claim 6, wherein the second parameter adjustment interface further includes an adjusting bar, the adjusting bar is connected to the selected area, and an end of the adjusting bar corresponds to the second position.

9. The electronic device according to claim 6, wherein the first parameter value is changed to the second parameter value gradually.

10. The electronic device according to claim 6, wherein displaying the second parameter value in the selected area is performed when the information that the object enters to the peripheral region is received.

11. The electronic device according to claim 6, wherein before displaying the second parameter value in the selected area, the processing unit is configured to further execute a step of:

receiving an additional sliding touch input via the object to slide the object from the third position to an additional adjusting position in the selected area;

displaying the first parameter adjustment interface;

displaying a fourth parameter value in the inner circular area, wherein the fourth parameter value corresponds to color in the gradient color scale that is positioned on the surrounding area and closest to the additional adjusting position.

12. The electronic device according to claim 6, wherein, the gradient color scale provided on the surrounding area ring band of the first parameter adjustment interface disappears on the second parameter adjustment interface after the touch display is switched from the first parameter adjustment interface to display the second parameter adjustment interface.

\* \* \* \* \*